July 6, 1965     O. J. MARTIN     3,193,032
LOAD INDICIA CENTERING MECHANISM
Filed Oct. 2, 1963     2 Sheets-Sheet 1
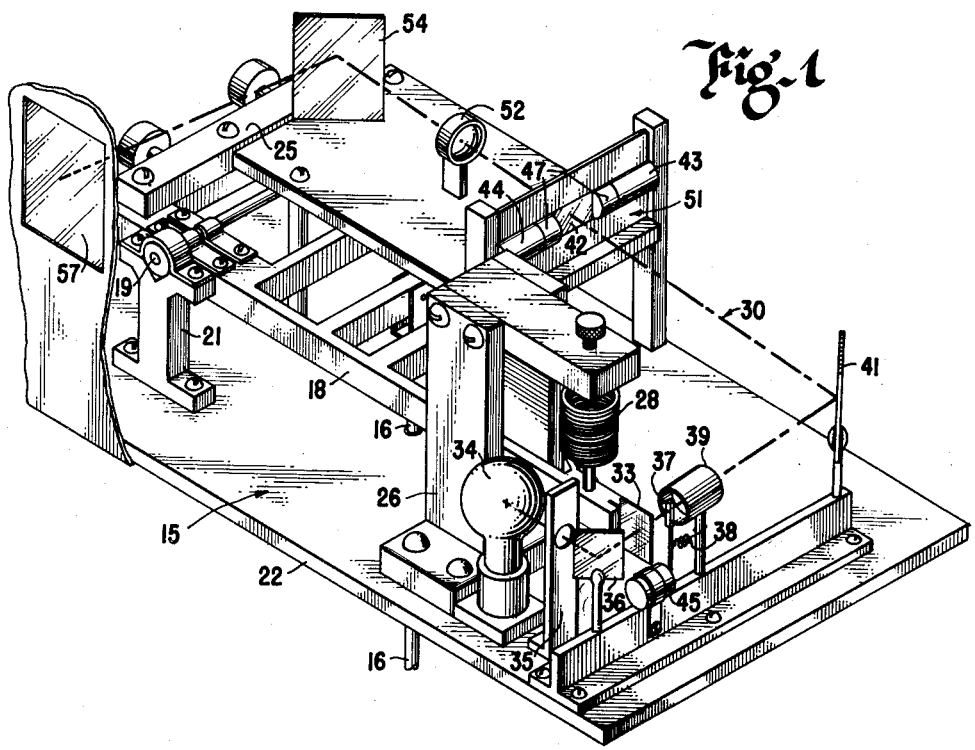
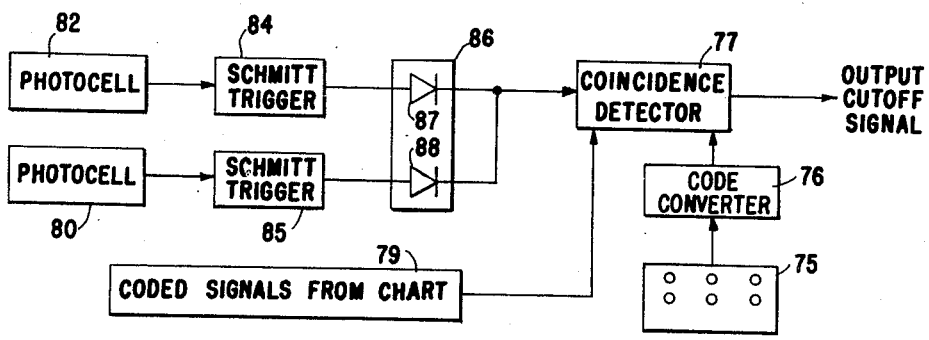
INVENTOR.
ORVAL J. MARTIN
BY
Marshall, Wilson & Yeasting
—attorneys—

July 6, 1965  O. J. MARTIN  3,193,032
LOAD INDICIA CENTERING MECHANISM
Filed Oct. 2, 1963  2 Sheets-Sheet 2

INVENTOR.
ORVAL J. MARTIN
BY Marshall, Wilson & Yeasting
attorneys

United States Patent Office 3,193,032
Patented July 6, 1965

---

3,193,032
LOAD INDICIA CENTERING MECHANISM
Orval J. Martin, Toledo, Ohio, assignor to Toledo Scale Corporation, Toledo, Ohio, a corporation of Ohio
Filed Oct. 2, 1963, Ser. No. 313,371
5 Claims. (Cl. 177—178)

This invention relates generally to condition responsive devices and in particular to a load indicia centering mechanism to be used therewith.

In present day condition responsive systems wherein a fast and accurate readout is desired, or which employs a printing mechanism to automatically or manually print out a ticket with the weight of the article thereon, it is important that weight indications be centered to the nearest graduation at the readout station. This is important for if it happens that the article being weighed is of a weight which is not an even graduation the indication at the readout station will be a fraction of the smallest weight graduation with the resulting attendant confusion of reading likely to result. In the past various mechanical means have been employed to insure that a weight indication to the nearest graduation be centered at the output device. The mechanical apparatus used in the past have taken on the form of mechanical detents, mechanical fingers, etc., which all have been responsive to the indication of a fractional number indication to advance the weight indicating chart to the succeeding whole number. However it has been found that the use of mechanical detents create new problems with respect to the sensitivity, speed and accuracy of the condition responsive device. Accordingly, it is to overcome the prior art deficiencies in whole number readout weight indicators that this invention is directed.

It is one object of this invention to improve the apparatus for, and techniques of centering load graduation output indicating mechanisms for condition responsive devices.

It is an object of this invention to provide a whole graduation weight indicating device at the readout station of a condition responsive device which is accurate and fast.

It is another object of this invention to provide a centered indicia output indicating device which employs no mechanical numeral advancing means and thereby eliminates the attendant lag and inaccuracy associated therewith.

A further object of this invention is to provide a material dispatching device which is non-responsive to fractional load indications from a condition responsive device.

Further objects and features of the invention will become evident as details of construction and operation of the invention are explained in the ensuing specification with reference to the accompanying drawings, in which:

FIG. 1 is a schematic representation in perspective of the mechanical and electrical components employed in the condition responsive device of this invention;

FIG. 3 illustrates in block diagram form the application of this invention to accomplish a material measuring operation.

Figure 2:
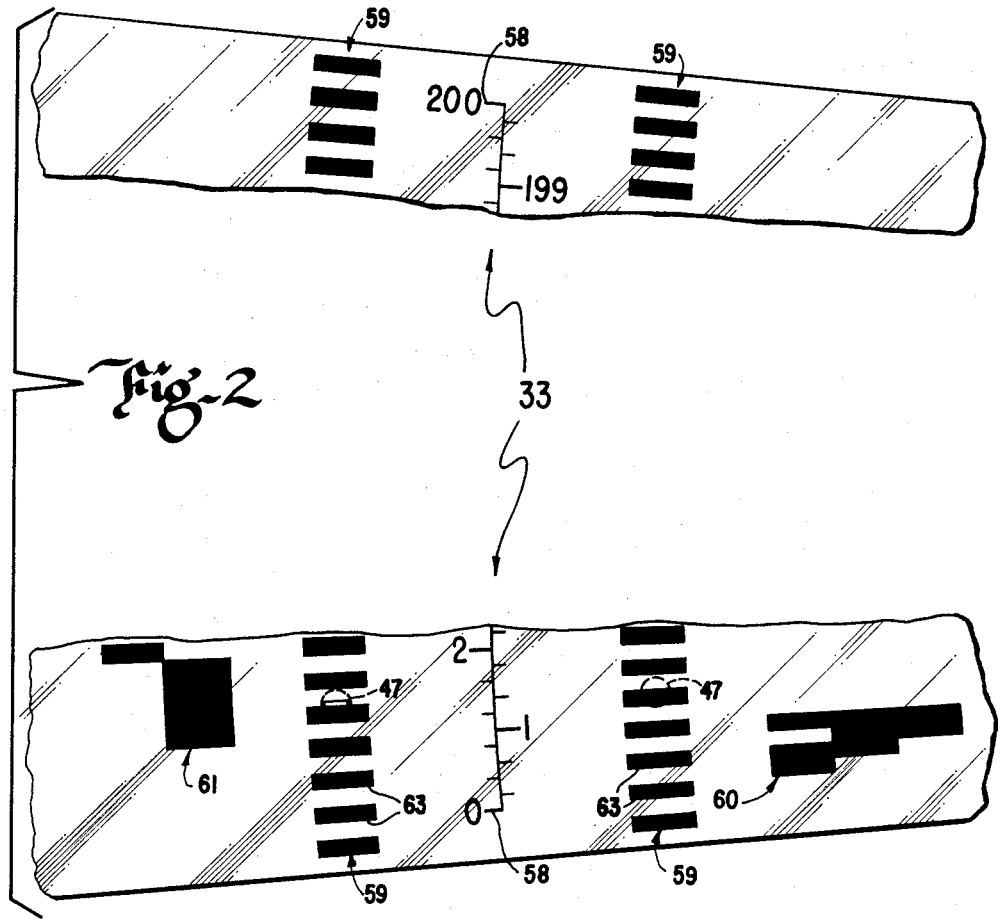
FIG. 2 is an enlarged partial view of the load and code indicia carrying chart employed in the condition responsive device of FIG. 1.

Referring to the drawings, there is shown in FIG. 1 the mechanical and electrical components employed in my condition responsive device in accordance with the invention including, a weighing scale 15, a light projecting optical path 30, and optical path deflecting circuitry 45. The weighing scale 15 employed in my invention is of standard design, and may be of the form described in Patent No. 2,937,862, issued to L. S. Williams on May 24, 1960. In order to prevent undue complexity I will only show and describe the parts of a typical scale which are essential to bring out the details of my invention. However, it should be understood that in actual practice a scale such as shown in the last-mentioned patent will be employed. Accordingly, the weighing scale includes a platform and load supporting levers therefor, neither being shown, to which a load to be weighed is applied. Steel yard rod 16 will have one end thereof connected to the output lever of the load supporting lever system. The other end of rod 16 is connected to the main counterforce lever 18. Further, counterforce lever 18 is fulcrumed on lever support bearing 19, which in turn is cradled on fulcrum stand 21. Fulcrum stand 21 is positioned upon base plate 22. There are also provided counterweights 25 which perform their well-known function of balancing the scale under zero load conditions. Further, there is also provided a tare beam supporting tower 26, which of course carries the tare compensating mechanism and which for clarity reasons are not shown. Spring 28, shown to be effectively connected between a point intermediate one end of main lever 18 and an extension of tare tower 26, provides the load counterbalancing force and, accordingly, balances the forces created due to the application of a load on the platform of the scale. Base plate 22 may be locatable, proximate or remotely away from the load receiving platform in accordance with the convenience or purpose of the operation.

The weighing scale which I employ includes an optical load readout system. Included in the optical readout system is chart 33 which is shown in more detail at FIG. 2. Chart 33 is positioned, as shown in FIG. 1, upon lever 18 for movement therewith. The image projecting path, generally designated by numeral 30 in FIG. 1, results in a visual numerical weight indication, to the nearest highest graduation, being centered at display surface 57.

Chart 33 is generally made up of a translucent material and has opaque indicia placed thereupon. As shown in FIG. 2, chart 33 will have its indicia laid out along arcuate tracks which extend in the direction of travel which the chart will assume upon a displacement of lever 18. All of the indicia tracks are curved along an arc centered at the fulcrum of the main lever 18 to maintain a fixed transverse position of the projection image at the display screen 57 for all deflections of the scale. The arcuate layout of detent tracks 59 and code tracks 60 and 61, whose function still remains to be disclosed, enables the image of any darkened bar of information thereof to be applied to the photosensitive area of the photocells 43, 44 and 47 for any amount of load applied to the scale. In the same manner transverse shifting of the numerical load indications on display screen 57 is avoided.

The detent tracks 59 which are shown to be symmetrically spaced about the numerical load indicating track 58, each consists of alternate bars of opaque and transparent markings. In should be appreciated that the bars in the detent track may be made up of various patterns and the code shown is merely for purposes of illustration. It is also possible to have only a single detent track, or to do away with both tracks and to utilize the numerical load graduations for optical detent purposes. Proceeding with the explanation of chart 33 as shown in FIG. 2, detent tracks 59 are shown to each comprise corresponding alternate opaque and transparent bars of information. The detent bar in each track associated with the first load indicating indicia extends substantially from the lowermost edge of the zero load graduation to the lowermost edge of the .2 pound indicating graduation. A transparent bar, or a lack of information, then extends from the .2 pound graduation to the .4 pound graduation.

This alternate opaque and transparent bar pattern is then repeated for the remaining succeeding load graduations. As mentioned above another pattern could have been chosen. As a result of the detent code shown, a series of transitional zones, or marking border lines, marked by numeral 63 in FIG. 2, being formed at substantially the leading edge of each load indicating graduation.

Therefore upon a load being applied to the scale platform, which is effectively connected to main counterforce lever 18 by steel yard rod 16, lever 18 will be deflected to a predetermined position against the resisting force of counter spring 28. In turn, chart 33 which is mounted upon lever 18 will also be displaced from its zero indicating position. As shown in FIG. 1, chart 33 is positioned for movement across optical light projecting path 30.

The optical projecting system employed with my condition responsive device comprises a light source 34, a condensing lens 35, a reflector 36 arranged to project a beam of light generally normal to chart 33, all of which are mounted in proper elevation to each other upon base plate 22. Also, a detent prism 37 is mounted upon a clapper of normally unenergized solenoid 45. Prism 37 is biased to assume a first position in the projection path 30 by spring 38 with solenoid 45 in its unenergized state, and assumes a second position therealong upon the energization of solenoid 45. It is of course clear that under the above conditions the path which the beam of light from source 34 takes will lie within a plane that is normal to the plane within which chart 33 lies. Also, upon the energization of solenoid 45 by circuitry still to be described, prism 37 will be drawn to a second position along the projection path and will accordingly result in a variation of the angle which the beam of light assumes after passing through chart 33. While the prism shape and prism position relative to chart 33 may have been selected to result in a bending of the light beam from source 34 to achieve a lower numerical load indicia being centered upon display surface 57, it was felt that it would be more desirable to have a higher load indicia being centered under solenoid operating conditions. The chart indicia is thereafter transmitted through projecting lens 39 to deflecting mirror 41. Mirror 41 results in an additional 90° bend in the light beam and accordingly the projected chart information will be passed through the chart reading station formed by projecting lens 42 at photocells 43, 44 and 47. It is of course obvious that as many banks of photocells, corresponding to those indicated by numerals 43 and 44, can be used in accordance with the amount of coded load indicating indicia upon the chart. Only two have been shown in this illustration for matters of simplicity and clarity. As shown in FIG. 1 the lens and photocells are supported at the proper beam intercepting elevation above base plate 22 by the support structure 51. The numerical load indicia is then passed through lens 42 to projecting lens 52 and from there by way of reflector 54 to the display surface 57.

The coded information will be read by photocell banks 43 and 44 and will in turn be used to perform certain batching functions to be explained hereinafter in connection with FIG. 3. Photocells 47 are optical detent photocells and are part of the Wheatstone bridge circuitry of FIG. 4 whose function will now be described in greater detail. The load applied to the scale platform may be of such value that chart 33, whose position is governed by the displacement of lever 18 in response to the load applied, will assume a beam intercepting position which is intermediate the fractional load indicating indicia of track 58. Accordingly the indicia displayed at screen 57 will not be of an even graduation but will be a fraction thereof with the resulting confusion in reading, etc. To avoid this confusion I have included detent tracks 59 whch form transitional zone or borderline 63, as explained above, in alignment with the load indicating indicia in track 58. The detent code information contained in tracks 59 will be transmitted by the projecting lens and mirror system to detent photocells 47. Photocells 47 as well as the code reading photocell banks 43 and 44 are light sensitive, and variation in the intensity of illumination falling thereupon will cause inverse variations in their resistance values. Photocells 47 are in staggered relationship to each other, that is, they are at different elevation levels above base plate 22. The staggered relationship between photocells 47 is better shown in FIG. 2 where they are shown in phantom relative to detent tracks 59. From FIG. 2 it can be seen that the detent photocells occupy positions on either side of a load indicating indicia so that for any given chart position only one cell may be in registration with a marking borderline. This reading zone defined by photocells 47 is used to determine if the numerical indicia displayed at screen 57 is centered, and if not to insure that the next succeedingly higher graduation from the current fractional load indicating chart position will be centered thereat.

My optical detent circuitry works under the principle that a photocell sensing circuitry can best respond to a change in light intensity, and accordingly I have chosen my detent prism actuating circuitry to be effective in response to the sensing of transitional zones 63, rather than to the picking out of a detent bar of information as a control therefor. More specifically, optical detents which have a single photocell to sense individual detent bars of information centered about load indicating indicia have been attempted. But it has been found that such a system results in a certain amount of zeroing in problems before a proper centering can be achieved. The zeroing in problems are of course accompanied with the usual flutter and waste of time associated therewith. These disadvantages are not present in my invention.

Specifically, certain detent information will be projected to photocells 47 in accordance with the position of chart 33. If the chart position is such that both photocells are dark or both are light, that is both cells will be similarly energized, indicating that the chart has not stopped in a transitional zone 63 projecting position, then properly centered load indicia will not be projected to display chart 57. However, if chart 33 stops in a load indicating position such that one detent photocell is sensing an opaque detent bar in its associated track 59 whereas the other photocell is sensing a translucent detent bar in its associated detent track then it is clear that a properly centered load graduation is being projected to display screen 57 and that a detent operation is not necessary. Relating the above operation to the detent solenoid operating circuitry of FIG. 4, wherein the photocells 47 are depicted as variable resistors 47, it can be appreciated that if the circuitry has been calibrated with say both photocells dark for a no current amplifying condition then if both photocells 47 are sensing detent bars the values of the two variable resistors will be equal and no current will be detected or amplified by amplifier 72. Similarly, if photocells 47 are both sensing translucent bars of detent track 59 then the resistance values of both resistors in the bridge circuit will be equally reduced so that once again amplifier 72 will not be sensing or amplifying a current differential.

Figure 4:
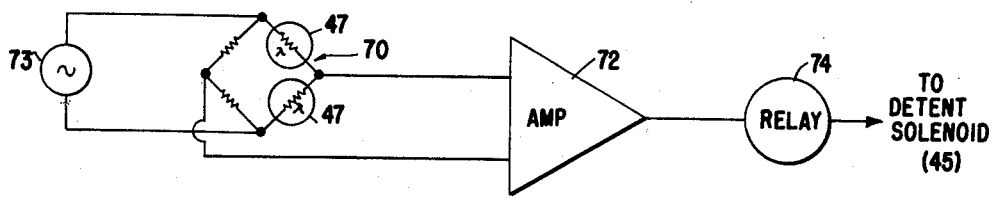
FIG. 4 is an illustration of the electrical control circuit controlling the position of an optical prism employed in the condition responsive device of FIG. 1.

However, if one of the photocells is sensing an opaque detent information bar, thus resulting in a higher value of resistance therefore in the Wheatstone bridge circuit of FIG. 4, whereas the other photocell is concurrently sensing a translucent zone in its detent track, to result in its resistance value dropping to a low value, then a difference in potential from that to which the bridge was originally balanced will occur. Accordingly, a difference signal will be amplified by amplifier 72 and the result is that relay 74 will be energized to actuate solenoid 45. Upon solenoid 45 being actuated, its associated clapper, upon which prism 37 is mounted, will be positioned to a different position in the projection path against the biasing resistance of spring 38, to result in the bending of the light beam from its normal position through chart 33 to a different advanced position thereafter. As explained above this amount of beam shifting is a constant value and will always result in the succeedingly higher graduation of indicia 58, next to the current intermediate fractional position at which chart 33 has stopped, being centered upon display screen 57.

In the above manner it can be seen that only if the chart assumes a load responsive position which is between the fractional load indicating indicia thereon will the optical detent circuitry be activated to result in the detent prism bending the light beam through the chart in a direction to achieve the centering of the immediately adjacent load indicating indicia at screen 57.

Shown in FIG. 3 is an additional application of my invention. As explained herein before code tracks, of which only the units and ten code are shown in the FIGURE 2 chart, are provided which represent the numerical load indicating indicia in terms of a predetermined code. It is of course obvious that additional code tracks representative of the hundreds, thousands, etc., digits can also be provided in keeping with the load capacity of the scale. In addition, although I have only shown two banks of photocells, 43 and 44, which are responsive repetitively to the units and ten code embossed on chart 33, that additional photocell banks will be provided in accordance with the number of code tracks used. As further shown in FIG. 2 the code graduations of tracks 60 and 61 are of substantially the same transverse size as, and they are vertically aligned with, the corresponding load graduations of track 58. Accordingly the transitional zones or borderlines 63 of detent track 59 can be used in a corresponding manner with the binary coded information as it was with the load graduation indicia. That is, the occurrence of a borderline signal can be used to indicate that concurrently with the generation thereof, by photocells 47, that the photocells in banks 43 and 44, and as many additional banks as are provided, are scanning actual load indicia provided, and that the coded signals currently being generated are not false signals which may occur due to the photocells responding in unpredictable ways at points intermediate the coded indicia provided. It is well-known that as the photocells are transferred from one binary code indicating load graduation to the next that signals may be generated by the photocell reading banks which correspond to higher or lower load indicating graduations, and accordingly it may appear, at the photocell reading station, like loads which are not currently present have occurred.

The above concept finds immediate application in a dynamic batching application of the type described in U.S. Patent No. 3,106,974 issued October 15, 1963 in the name of R. B. Williams, Jr., of common ownership herewith, now Patent No. 3,106,974. As described in more detail in the last-mentioned patent it is often desirable to be able to accomplish a transfer of a predetermined amount of ingredient or ingredients from a plurality of storage hoppers without the aid of an operator.

Accordingly in FIG. 3 I have described in block diagram form an automatic batching system wherein block 75 represents a decimal selecting control board which cumulatively stores the amount of the various ingredients desired and serially supplies the data to code converting unit 76. For example, if it was desired that fifteen pounds of ingredient x be supplied, twenty pounds of ingredient y, and .4 pound of ingredient z be batched together the operator would supply this information to board 75 and this information would be used to transfer the correct ingredient storing bin over the scale platform after the desired amount of ingredient had been supplied. Code converting unit 76 would be supplying continuously increasing values of the desired amount of material to the coincidence detector 77, and upon the transfer of the desired amount of material from the storage bin to the scale, as evidenced by the generation of a load signal from code tracks 60 and 61 of chart 33 by the code reading photocells 43 and 44, an output transfer signal which transfers the storage hopper of the next desired ingredient over the scale occurs. The signals being continuously generated by photocells 43 and 44 from a scanning of code tracks 60 and 61 on chart 33 are represented by blocks 79 in FIG. 3. Photocells 47 are represented by numerals 80 and 82. The signals generated by these photocells may not all have the same shape and accordingly a Schmitt trigger which is of conventional design, is used to amplify and shape the photocell signals into standard pulses. The Schmitt triggers for the photocells are respectively indicated by blocks 84 and 85.

Also, since we only want to determine if there is a correspondence between the signals supplied by the code converting unit 76, and which represents the amount of the desired ingredient, with the code signals from chart 33, as represented by block 79 in FIG. 3, and which represents the value of the load currently being weighed by the scale, at times corresponding to occurrence of load indicating indicia; and not during the transition period between coded information indicia, since the signal being generated by unit 79 will not be a true representation during the fractional weights between load graduations, it is necessary to use a gating signal supplied by an exclusive OR gate 86 to achieve the conditioning function. Block 86 is an exclusive OR gate of standard design and any of the many known circuits which result in an output signal being generated if only one of two input signals but not both are present thereto may be used. Therefore, as shown in FIG. 3, gate 86 will result in a gating signal being supplied to coincidence detector 77 only at the occurrence of detent marking borderlines 63, which of course is as desired, since it is only at this transitional zone time that the photocells 43 and 44 will be in a true scanning relation to the coded graduations of tracks 60 and 61 and not between succeeding coded information graduations. Coincidence detector 77 is of standard design and any of the many well-known AND gating and comparison circuits can be used.

Accordingly in keeping with the example outlined above, code converter 76 will be initially supplying a signal of fifteen pounds in the same code as that used on chart code tracks 60 and 61 to coincidence detector 77. Ingredient x will flow from its storage hopper into a hopper resting on the scale platform of my condition responsive device, not shown. Chart 33 which is mounted on lever 18 will be continuously assuming different positions in response to the load being applied to the scale platform. Photocells 47 will be generating signals in response to the detent code contained in tracks 59, and concurrently therewith cells 43 and 44 will be generating coded signals representative of the weight on the scale. However, OR gate 86 is effective to permit a comparison of the weight currently on the scale, as evidenced by the coded signals from block 79, with that of the coded signals from code converting unit 76 only at the time that a load indicating code should occur and not at times intermediate thereof. Accordingly as soon as the chart assumes a position in response to 16 pounds of ingredient x being supplied to the scale photocells 47 will respond to the fact that a load indicating graduation is being scanned and therefore enable gate 86. The generation of a signal by gate 86 in turn enables coincidence detector 77. Now since a coded signal representative of fifteen pounds is being generated by photocells 43 and 44, block 79 of FIG. 3, a signal will be generated by coincidence detector 77 to cutoff further feeding of ingredient x to the scale. The output signal may also be effective to result in the hopper containing the ingredient y being transferred to an ingredient transferring position over the scale platform. Also concurrently with the above events the code converter will now be generating a signal of 35 pounds, which since there are already 15 pounds of ingredient x on the scale will insure that the desired twenty pounds of ingredient y will be added.

Gate 86 will continue to suply triggering signals to coincidence detector 77 for as long as coded load indicating graduations on chart 33 are moved into a reading position, and prevent the comparison during chart positions which are intermediate load indicating graduations, and in that way prevent ambiguous signals which may look like the desired quantities from falsely causing an output from the detector 77. Accordingly upon the scale being supplied with 20 pounds of ingredient $y$, chart 33 will generate a signal of 35 pounds and this will correspond to the signal from code converter unit 76 to result in a cessation of ingredient $y$ being fed onto the scale. The output signal from detector 77 is also effective to transfer the storage hopper of ingredient $z$ in an ingredient transferring position relative to the scale hopper. Further, since only .4 pound of ingredient $z$ is desired, code converting unit 76 will supply a coded signal representative of 35.4 pounds to coincidence detector 77. In a manner similar to the steps outlined above for ingredients $x$ and $y$, coincidence detector 77 will be enabled upon the occurrence of 35.4 pounds by the coincidence of pulses from OR gate 86, coded chart signals from cells 43 and 44, and the signal from code converting unit 76 to result in an output cutoff signal being generated thereby.

Having described the invention, I claim:

1. A control circuit comprising, in combination, a coincidence detector which produces an output signal when three input signals are present, means for supplying a predetermined input signal to the detector, means for supplying a condition responsive input signal to the detector, and means for supplying a detent input signal to the detector in the form of a train of pulses one of which coincides in time with a condition responsive input signal that is the same as the predetermined input signal.

2. A weighing scale system which includes the control circuit according to claim 1 wherein the means for supplying the condition responsive input signal includes a load responsive code bearing chart and means for reading out the code.

3. A weighing scale system which includes the control circuit according to claim 1 wherein the means for supplying the detent signal includes a load responsive indicia bearing chart and means for scanning the indicia.

4. A weighing scale system comprising, in combination, a coincidence detector which produces an output signal when three input signals are present, means for supplying a predetermined input signal to the detector, weighing mechanism responsive to load upon the scale, a code bearing chart movable with the weighing mechanism, means for reading out the code and supplying a load responsive input signal to the detector, and means for supplying a detent input signal to the detector in the form of a train of pulses one of which coincides in time with a load responsive input signal that is the same as the predetermined input signal.

5. A weighing scale system comprising, in combination, a coincidence detector which produces an output signal when three input signals are present, means for supplying a predetermined input signal to the detector, weighing mechanism responsive to load upon the scale, a code bearing chart movable with the weighing mechanism, means for reading out the code and supplying a load responsive input signal to the detector, the chart also having two readout control tracks each comprising a plurality of indicia of alternately differing transparencies, and detent means for scanning the control tracks to supply a detent input signal to the detector, the readout control tracks and the detent means being so arranged relative to the code on the chart that the detent input signal is in the form of a train of pulses one of which coincides in time with a load responsive input signal that is the same as the predetermined input signal.

References Cited by the Examiner
UNITED STATES PATENTS

| | | | |
|---|---|---|---|
| 2,715,353 | 8/55 | Kuhnle | 88—24 |
| 2,731,880 | 1/56 | Beeson | 88—24 |
| 2,937,862 | 5/60 | Williams | 177—36 |
| 2,978,953 | 4/61 | Rantsch | 88—24 |
| 3,042,128 | 7/62 | Bell et al. | 177—210 |
| 3,053,143 | 9/62 | Meier | 88—24 |
| 3,101,801 | 8/63 | Miller | 177—70 |
| 3,105,940 | 10/63 | Bell et al. | 177—12 |
| 3,106,974 | 10/63 | Williams | 177—70 |
| 3,130,802 | 4/64 | Bell | 177—12 |

LEYLAND M. MARTIN, *Primary Examiner.*